United States Patent
Liang et al.

(10) Patent No.: US 12,452,796 B2
(45) Date of Patent: Oct. 21, 2025

(54) METHOD AND USER EQUIPMENT FOR CONTROLLING TRANSMISSION POWER OF POS-SRS IN CARRIER AGGREGATION

(71) Applicant: MediaTek Singapore Pte. Ltd., Singapore (SG)

(72) Inventors: Xiao Liang, Shanghai (CN); Chiao-Yao Chuang, Hsinchu (TW); Jijian Chen, Shanghai (CN); Xuancheng Zhu, Shanghai (CN); Pengli Yang, Shanghai (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 306 days.

(21) Appl. No.: 18/354,107

(22) Filed: Jul. 18, 2023

(65) Prior Publication Data

US 2024/0023029 A1  Jan. 18, 2024

(30) Foreign Application Priority Data

Jul. 18, 2022 (WO) ................. PCT/CN2022/106257
Jul. 12, 2023 (CN) ......................... 202310851786.7

(51) Int. Cl.
*H04W 52/14* (2009.01)
*H04B 7/04* (2017.01)
*H04B 7/0408* (2017.01)
*H04L 5/00* (2006.01)
(Continued)

(52) U.S. Cl.
CPC ....... *H04W 52/242* (2013.01); *H04W 52/245* (2013.01); *H04W 52/325* (2013.01)

(58) Field of Classification Search
None
See application file for complete search history.

(56) References Cited

U.S. PATENT DOCUMENTS 9,420,476 B2 *  8/2016  Koutsimanis .......... H04J 11/005
9,516,650 B2 * 12/2016  Ouchi .................... H04W 52/54
9,801,143 B2 * 10/2017  Ouchi ................. H04W 52/242
(Continued)

FOREIGN PATENT DOCUMENTS

CN   112534891 A    3/2021
CN   114270952 A    4/2022
WO   2022/078115 A1 4/2022

OTHER PUBLICATIONS

International Search Report and Written Opinion dated Dec. 16, 2022, issued in application No. PCT/CN2022/106257.

*Primary Examiner* — Tuan A Tran
(74) *Attorney, Agent, or Firm* — McClure, Qualey & Rodack, LLP

(57) ABSTRACT

A method, which is applied to a UE, for controlling the transmission power of each of positioning (POS) sounding reference signals (SRSs) across a subset of multiple component carriers (CCs) in carrier aggregation is provided. A SRS configuration for a subset of the CCs is received. Pathlosses corresponding to SRS transmission in the subset of the CCs are measured. Pathloss measurements corresponding to the subset of the CCs are processed to obtain a single pathloss across the subset of the CCs. The transmission power of each of the POS-SRSs across the subset of the CCs is determined based on the single pathloss. Each of the POS-SRSs are transmitted with the transmission power through the CCs.

20 Claims, 3 Drawing Sheets

(51) Int. Cl.
*H04W 52/24* (2009.01)
*H04W 52/32* (2009.01)

(56) References Cited

U.S. PATENT DOCUMENTS

| | | | | |
|---|---|---|---|---|
| 9,832,732 | B2 * | 11/2017 | Ouchi | H04W 52/245 |
| 10,103,832 | B2 * | 10/2018 | Koutsimanis | H04W 24/02 |
| 10,771,214 | B2 * | 9/2020 | Zhang | H04L 5/0094 |
| 11,019,571 | B2 * | 5/2021 | Wernersson | H04W 52/146 |
| 11,178,622 | B2 * | 11/2021 | Li | H04L 5/0051 |
| 11,191,031 | B2 * | 11/2021 | Ryu | H04W 52/146 |
| 11,228,984 | B2 * | 1/2022 | Harrison | H04B 7/0465 |
| 11,653,312 | B1 * | 5/2023 | Abotabl | H04W 52/38 |
| | | | | 455/522 |
| 11,864,120 | B2 * | 1/2024 | Zhang | H04B 7/0695 |
| 11,895,596 | B2 * | 2/2024 | Ryu | H04W 52/246 |
| 11,973,541 | B2 * | 4/2024 | Zhou | H04W 52/242 |
| 12,041,553 | B2 * | 7/2024 | Khoshnevisan | H04L 1/189 |
| 12,092,750 | B2 * | 9/2024 | Fakoorian | H04W 24/08 |
| 12,156,139 | B2 * | 11/2024 | Wernersson | H04B 7/0617 |
| 12,356,336 | B2 * | 7/2025 | Dinan | H04L 5/0053 |
| 12,356,404 | B2 * | 7/2025 | Dinan | H04W 72/20 |
| 2021/0084510 | A1 | 3/2021 | Ryu et al. | |
| 2021/0120500 | A1 | 4/2021 | Zhou et al. | |
| 2022/0029764 | A1 * | 1/2022 | Liou | H04L 5/0094 |
| 2022/0225145 | A1 * | 7/2022 | Wu | H04L 5/0094 |
| 2023/0066384 | A1 * | 3/2023 | Fakoorian | H04W 64/00 |
| 2023/0156622 | A1 | 5/2023 | Cha et al. | |

\* cited by examiner

METHOD AND USER EQUIPMENT FOR CONTROLLING TRANSMISSION POWER OF POS-SRS IN CARRIER AGGREGATION

CROSS REFERENCE TO RELATED APPLICATIONS

This application claims the benefit of Patent Cooperation Treaty Application No. PCT/CN2022/106257, filed on Jul. 18, 2022, and China Application No. 202310851786.7, filed Jul. 12, 2023, the entirety of which is incorporated by reference herein.

BACKGROUND OF THE INVENTION

Field of the Invention

The present invention relates to a method applied in carrier aggregation, and, in particular, to a method for controlling the transmission power of positioning (POS) sounding reference signals (SRSs) in carrier aggregation.

Description of the Related Art

For sounding reference signal (SRS) transmission, the pathloss reference signal (RS) which is a downlink RS, is configured within a SRS resource set, and a SRS resource set is configured within an uplink (UL) bandwidth part (BWP) of a component carrier. SRS is transmitted with the power measured on the pathloss RS, p0, and alpha. Unless specified, the following CCs would denote uplink CC.

SRS aggregation on different component carriers (intraband contiguous carrier) is a way to improve accuracy by using a higher transmission bandwidth. However, the pathloss RS is configured per SRS resource set per CC, the average transmission power of the pathloss RS across CCs may not be the same. If the average transmission power of the pathloss RS across CCs is the same, the measured reference symbol received power (RSRP) may still be different. Then based on the measurement results, the SRS may be transmitted by different average power across CCs.

BRIEF SUMMARY OF THE INVENTION

An embodiment of the present invention provides a method for controlling the transmission power of positioning (POS) sounding reference signals (SRSs) in carrier aggregation. The method is applied to a user equipment (UE). The method includes the following stages. A SRS configuration for a subset of multiple component carriers (CCs) is received. Pathlosses corresponding to SRS transmission in the subset of the CCs are measured. Pathloss measurements corresponding to the subset of the CCs are processed to obtain a single pathloss across the subset of the CCs. The transmission power of each of the POS-SRSs across the subset of the CCs is determined based on the single pathloss. The POS-SRSs are transmitted with the transmission power through the CCs.

According to the method described above, the step of processing the pathloss measurements corresponding to the subset of the CCs to obtain the single pathloss across the subset of the CCs includes the following stage. The pathlosses corresponding to the subset of the CCs are averaged to obtain the single pathloss.

According to the method described above, the step of processing the pathloss measurements corresponding to the subset of the CCs to obtain the single pathloss across the subset of the CCs includes the following stage. The minimum pathloss or the maximum pathloss among the pathlosses corresponding to the CCs is selected as the single pathloss.

According to the method described above, the step of processing the pathloss measurements corresponding to the subset of the CCs to obtain the single pathloss across the subset of the CCs includes the following stage. One pathloss among the pathlosses corresponding to the subset of the CCs is determined to obtain the single pathloss.

According to the method described above, the step of measuring the pathlosses corresponding to the subset of the CCs includes the following stage. A reference signal received power (RSRP) of a pathloss reference signal (RS) in the subset of the CCs is measured. The pathloss RS has a configured power to be transmitted from a base station to the UE. The power difference between the configured power and the RSRP of the pathloss RS corresponding to the subset of the CCs is measured to obtain the pathlosses.

According to the method described above, the step of processing the pathloss measurements corresponding to the subset of the CCs to obtain the single pathloss across the subset of the CCs is configured by a network.

According to the method described above, the SRS configuration is configured by a radio resource control (RRC) signal.

The method further includes the following stage. A pathloss measurement corresponding to one of the subset of the CCs is processed to obtain the signal pathloss.

An embodiment of the present invention provides a method for controlling the transmission power of positioning (POS) sounding reference signals (SRSs) in carrier aggregation. The method is applied to a network. The method includes the following stages. A SRS configuration for a subset of multiple component carriers (CCs) is transmitted to a UE. The UE is configured to measure pathlosses corresponding to SRS transmission in the subset of the CCs through the SRS configuration. The UE is configured to process pathloss measurements corresponding to the subset of the CCs through the SRS configuration to obtain a single pathloss across the subset of the CCs. Each of the POS-SRSs across the subset of the CCs with the transmission power determined based on the single pathloss are transmitted through the CCs from the UE.

According to the method described above, the step of configuring the UE to process the pathloss measurements corresponding to the subset of the CCs through the SRS configuration to obtain the single pathloss includes the following stage. The UE is configured to average the pathlosses corresponding to the subset of the CCs through the SRS configuration to obtain the single pathloss.

According to the method described above, the step of configuring the UE to process the pathloss measurements corresponding to the subset of the CCs through the SRS configuration to obtain the single pathloss includes the following stage. The UE is configured to select the minimum pathloss or the maximum pathloss among the pathlosses corresponding to the subset of the CCs as the single pathloss through the SRS configuration.

According to the method described above, the step of configuring the UE to process the pathloss measurements corresponding to the subset of the CCs through the SRS configuration to obtain the single pathloss includes the following stage. The UE is configured to determine one pathloss among the pathlosses corresponding to the CCs through the SRS configuration to obtain the single pathloss.

According to the method described above, the step of configuring the UE to measure the pathlosses corresponding to the subset of the CCs through the SRS configuration includes the following stage. The UE is configured to measure a reference signal received power (RSRP) of a pathloss reference signal (RS) in the subset of the CCs. The pathloss RS has a configured power to be transmitted from a base station to the UE. The UE is configured to calculate the power difference between the configured power and the RSRP of the pathloss RS corresponding to the subset of the CCs to obtain the pathlosses.

According to the method described above, the SRS configuration is configured by a radio resource control (RRC) signal.

The method further includes the following stage. The UE is configured to process a pass loss measurement corresponding to one of the CCs to obtain the single pathloss.

An embodiment of the present invention provides user equipment (UE). The UE includes a processor. The processor is configured to perform the following steps in carrier aggregation. The processor receives a SRS configuration for a subset of multiple component carriers (CCs). The processor measures pathlosses corresponding to SRS transmission in the subset of the CCs. The processor processes pathloss measurements corresponding to the subset of the CCs to obtain a single pathloss across the subset of the CCs. The processor determines the transmission power of each of the POS-SRSs across the subset of the CCs based on the single pathloss. The processor transmits each of the POS-SRSs across the subset of the CCs with the transmission power through the CCs.

According to the UE described above, the UE averages the pathlosses corresponding to the subset of the CCs to obtain the single pathloss in the processing step.

According to the UE described above, the UE selects the minimum pathloss or the maximum pathloss among the pathlosses corresponding to the subset of the CCs as the single pathloss in the processing step.

According to the UE described above, the UE determines one of the pathlosses corresponding to the subset of the CCs to obtain the single pathloss in the processing step.

According to the UE described above, the UE measures a reference signal received power (RSRP) of a pathloss reference signal (RS) in the subset of the CCs. The pathloss RS has a configured power and is transmitted from a base station to the UE. The UE calculates the power difference between the configured power and the RSRP of the pathloss RS corresponding to the subset of the CCs to obtain the pathlosses in the measuring step.

According to the UE described above, the UE is configured by a network to perform the processing step.

According to the UE described above, the SRS configuration is configured by a radio resource control (RRC) signal.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
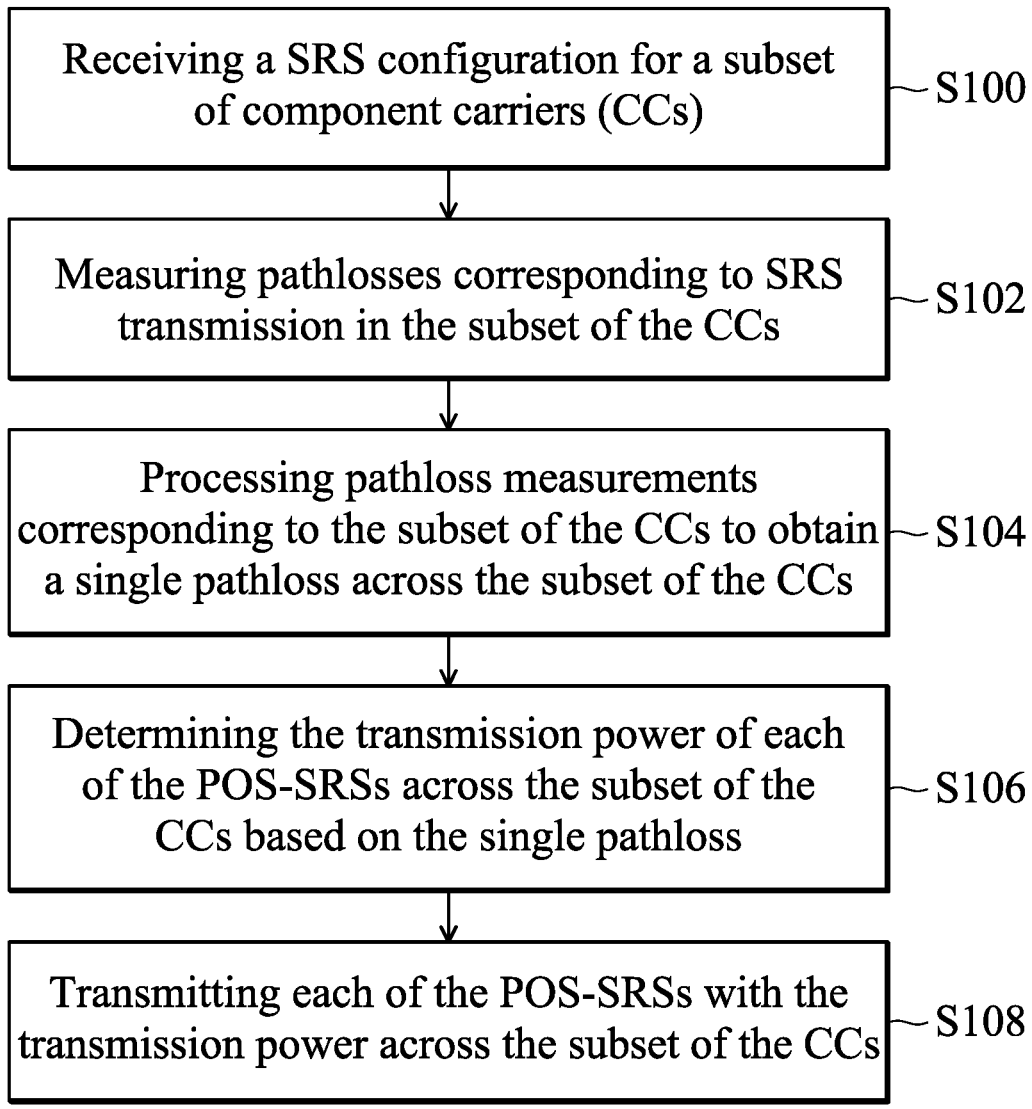
FIG. 1 is a flow chart of a method for controlling the transmission power of positioning (POS) sounding reference signals (SRSs) in carrier aggregation applied to a UE in accordance with some embodiments of the present invention.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present invention are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

FIG. 1 is a flow chart of a method for controlling the transmission power of positioning (POS) sounding reference signals (SRSs) in carrier aggregation applied to a UE in accordance with some embodiments of the present invention. As shown in FIG. 1, the method for controlling the transmission power of positioning (POS) sounding reference signals (SRSs) in carrier aggregation applied to the UE includes the following stages. A SRS configuration for a subset of multiple component carriers (CCs) is received (step S100). Pathlosses corresponding to the subset of the CCs are measured (step S102). Pathloss measurements corresponding to the subset of the CCs are processed to obtain a single pathloss across the subset of the CCs (step S104). The transmission power of each of the POS-SRSs across the subset of the CCs is determined based on the single pathloss (step S106). The POS-SRSs are transmitted with the transmission power through the CCs (step S108).

In some embodiments, in step S100, the SRS configuration is received from a base station. The UE is configured by a higher-layer signal to connect to a network through the base station. In some embodiments, the higher-layer signal can be a radio resource control (RRC) signal, but the present invention is not limited thereto. In some embodiments, the UE can be a feature phone, a smart phone, a tablet, a desktop, a laptop, or a machine type communication (MTC) device, but the present invention is not limited thereto. In some embodiments, the base station can be an Evolved Node B (eNB) or a Next-Generation Node B (gNB), but the present invention is not limited thereto. In some embodiments, the network may include an Evolved-Universal Terrestrial Radio Access Network (E-UTRAN) and an Evolved Packet Core (EPC), but the present invention is not limited thereto. In some embodiments, the network may include a Next-Generation Radio Access Network (NG-RAN) and a Next-Generation Core Network (NG-CN) (that is, 5G Core Network), but the present invention is not limited thereto.

In step S102, the UE measures a reference signal received power (RSRP) of a pathloss reference signal (RS) in the subset of the CCs. The pathloss RS has a configured power and is transmitted from the base station to the UE. The UE calculates the power difference between the configured power and the RSRP of the pathloss RS corresponding to the subset of the CCs to obtain the pathlosses across the subset of the CCs. It is possible that not all the CC within the subset of CCs for SRS transmission is configured with the pathloss RS, then the configured pathloss RSs within some CCs may be measured and may be corresponding to the subset of CCs. For example, the UE receives the SRS configuration for a first CC and a second CC. There is additional guard band between the first CC and the second CC. In detail, the UE receives a first pathloss RS from a downlink (DL) bandwidth part (BWP) located within the first CC, and measures the power difference of the first pathloss RS from the base station to the UE to obtain a first pathloss. Similarly, the UE also receives a second pathloss RS from a DL BWP located within the second CC, and measures the power difference of the second pathloss RS from the base station to the UE to obtain a second pathloss. Generally, the first pathloss may be different from the second pathloss, but the present invention is not limited thereto. After that, the UE performs the processing step in step S104 to process the first pathloss and the second pathloss.

In step S104, in some embodiments, the UE averages the pathlosses corresponding to the subset of the CCs to obtain the single pathloss. For example, the UE averages the first pathloss corresponding to the first CC and the second pathloss corresponding to second CC to obtain the single pathloss. In some embodiments, the UE selects the minimum pathloss or the maximum pathloss among the pathlosses corresponding to the subset of the CCs as the single pathloss. For example, if the first pathloss corresponding to the first CC is the minimum one or the maximum one, the UE selects the first pathloss corresponding to the first CC as the single pathloss. In some embodiments, the UE determines one pathloss among the pathlosses corresponding to the subset of the CCs to obtain the single pathloss. For example, the UE selects the first pathloss corresponding to the first CC or the second pathloss corresponding to the second CC as the single pathloss.

In step S106, the determining step is performed based on the technical specification of 3GPP TS 38.213. According to 3GPP TS 38.213, an equation 1 is disclosed as follows. If a UE transmits SRS based on a configuration by higher-layer parameter SRS-ResourceSet on active uplink (UL) BWP b of carrier f of serving cell c, the UE determines the SRS transmission power $P_{SRS,b,f,c}(i, q_s)$ in SRS transmission occasion i as $$P_{SRS,b,f,c}(i, q_s) = \min\left\{\begin{array}{l} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) \end{array}\right\} [\text{dBm}]$$

equation 1

In the equation 1, $P_{CMAX,f,c}(i)$ is the configured UE transmit power defined om [8, TS 38.101-1] and [8-2, TS38.101-2] in the 3GPP specification for carrier f of serving cell c in SRS transmission occasion i.

$P_{O\_SRS,b,f,c}(q_s)$ is provided by higher-layer parameter p0 for active UL BWP b of carrier f of serving cell c and SRS resource set $q_s$ provided by higher-layer parameter SRS-ResourceSet.

$M_{SRS,b,f,c}(i)$ is a SRS bandwidth expressed in number of resource blocks for SRS transmission occasion i on active UL BWP b of carrier f of serving cell c and μ is a subcarrier spacing configuration defined in [4, TS 38.211] in the 3GPP specification.

$\alpha_{SRS,b,f,c}(q_s)$ is provided by higher-layer parameter alpha for active UL BWP b of carrier f of serving cell c and SRS resource set $q_s$.

$PL_{b,f,c}(q_d)$ is a downlink pathloss estimate in dB calculated by the UE using RS resource index $q_d$ for active DL BWP of serving cell c and SRS resource set $q_s$ in [6, TS 38.214] in the 3GPP specification. The RS resource index $q_d$ is provided by higher-layer parameter pathlossReferenceRS associated with the SRS resource set $q_s$ and is either a higher-layer parameter ssb-Index providing a Synchronization Signal (SS)/Physical Broadcast Channel (PBCH) block index or a higher-layer parameter csi-RS-Index providing a Chanel State Information-Reference Signal (CSI-RS) resource index.

That is, the single pathloss obtained in step S104 is substituted into equation 1 to obtain the transmission power of each of the POS-SRSs in step S106. In order to produce the same pathloss compensation across CCs for power control based on several pathloss measurement results on different downlink RS (a d), the UE can process by averaging the pathlosses corresponding to the CCs to obtain the single pathloss, selecting the minimum pathloss or the maximum pathloss among the pathlosses corresponding to the subset of the CCs as the single pathloss, or determining one of the pathlosses corresponding to the subset of the CCs to obtain the single pathloss, but the present invention is not limited thereto. In step S108, for example, the UE transmits each of the POS-SRSs with the transmission power determined in step S106 (using equation 1) to the base station through the CCs (for example, the first CC and the second CC).

Figure 2:
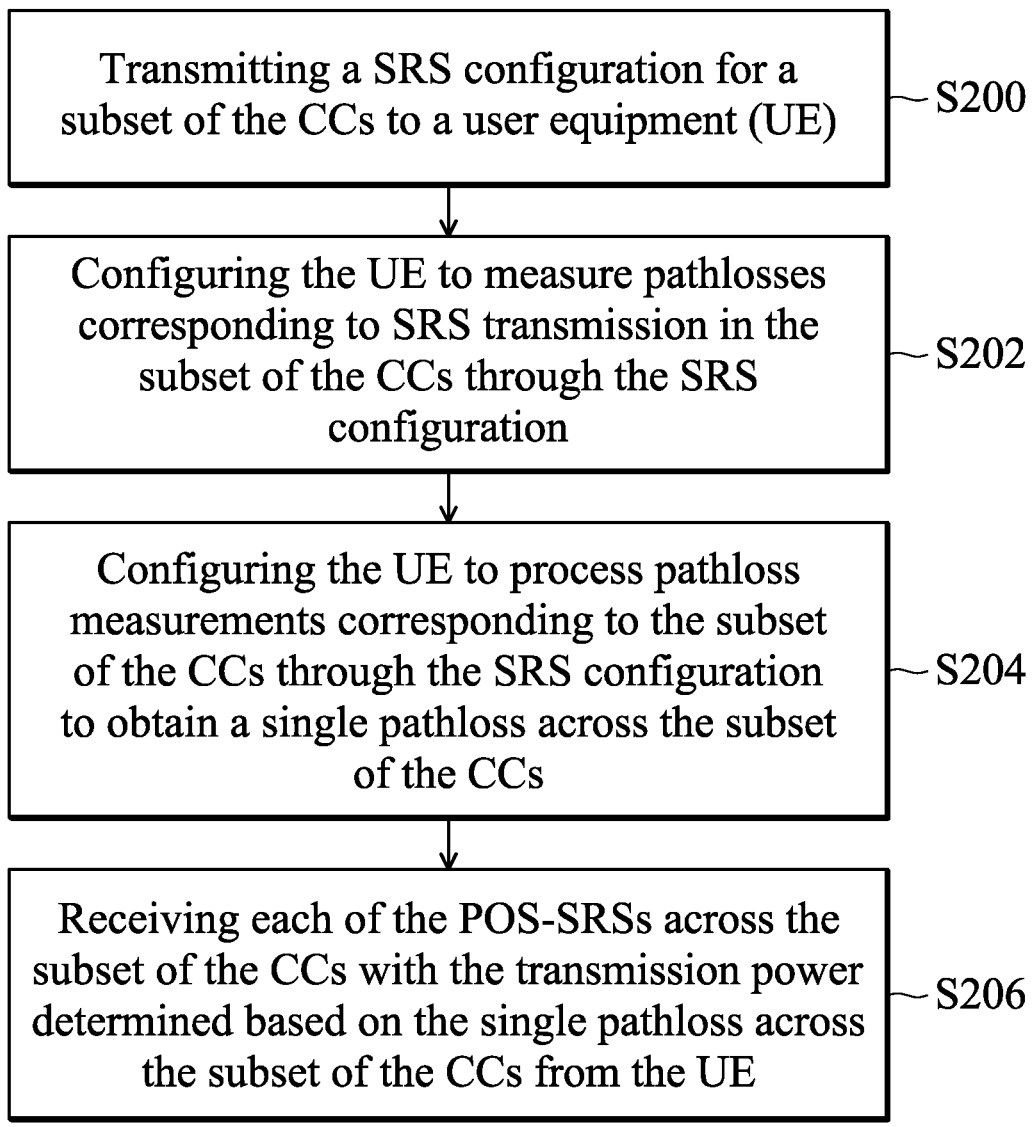
FIG. 2 is a flow chart of a method for controlling the transmission power of each of POS-SRSs in carrier aggregation applied to a network in accordance with some embodiments of the present invention.

FIG. 2 is a flow chart of a method for controlling the transmission power of POS-SRSs in carrier aggregation applied to a network in accordance with some embodiments of the present invention. As shown in FIG. 2, the method for controlling the transmission power of each of POS-SRSs across a subset of the CCs in carrier aggregation applied to the network includes the following stages. A SRS configuration for each of multiple CCs is transmitted to a UE (step S200). The UE is configured to measure pathlosses corresponding to the subset of the CCs through the SRS configuration (step S202). The UE is configured to process pathloss measurements corresponding to the subset of the CCs through the SRS configuration to obtain a single pathloss across the subset of the CCs (step S204). Each of the POS-SRSs across the subset of the CCs with the transmission power determined based on the single pathloss are received through the CCs from the UE (step S206).

In some embodiments, in step S200, the SRS configuration can be configured by a radio resource control (RRC) signal, but the present invention is not limited thereto. The network transmits the SRS configuration to the UE via a based station. In some embodiments, the network may include an Evolved-Universal Terrestrial Radio Access Network (E-UTRAN) and an Evolved Packet Core (EPC), but the present invention is not limited thereto. In some embodiments, the network may include a Next-Generation Radio Access Network (NG-RAN) and a Next-Generation Core Network (NG-CN) (that is, 5G Core Network), but the present invention is not limited thereto. In some embodiments, the base station can be an Evolved Node B (eNB) or a Next-Generation Node B (gNB), but the present invention is not limited thereto. In some embodiments, the UE can be a feature phone, a smart phone, a tablet, a desktop, a laptop, or a machine type communication (MTC) device, but the present invention is not limited thereto.

In step S202, after the UE receives the SRS configuration from the network, the network configures the UE to measure a RSRP of the pathloss RS in the subset of the CCs. The pathloss RS has a configured power and is transmitted from a base station to the UE. The network configures the UE to calculate the power difference between the configured power and the RSRP of the pathloss RS corresponding to the subset of the CCs from the base station to the UE to obtain the pathlosses. For example, the UE received the SRS configuration through a first CC and a second CC. The UE receives a first pathloss RS from a DL BWP located within the first CC, and measures the power difference of the first pathloss RS from the base station to the UE to obtain a first pathloss. Similarly, the UE also receives a second pathloss RS from a DL BWP located within the second CC, and measures the power difference of the second pathloss RS from the base station to the UE to obtain a second pathloss. Generally, the first pathloss may be different from the second pathloss, but the present invention is not limited thereto. After that, the network performs step S204 to configure the UE to process the first pathloss and the second pathloss.

In step S204, in some embodiments, the network configures the UE to average the pathlosses corresponding to the subset of the CCs to obtain the single pathloss across the subset of the CCs. For example, the network configures the UE to average the first pathloss corresponding to the first CC and the second pathloss corresponding to second CC to obtain the single pathloss across the subset of the CCs. In some embodiments, the network configures the UE to select the minimum pathloss or the maximum pathloss among the pathlosses corresponding to the subset of the CCs as the single pathloss across the subset of the CCs. For example, if the first pathloss corresponding to the first CC is the minimum one or the maximum one, the network configures the UE to select the first pathloss corresponding to each of the first CC as the single pathloss. In some embodiments, the network configures the UE to determine one pathloss among the pathlosses corresponding to the subset of the CCs to obtain the single pathloss across the subset of the CCs. For example, the network configures the UE to select the first pathloss corresponding to the first CC or the second pathloss corresponding to the second CC as the single pathloss.

After step S204 is performed by the network, the UE transmits each of the POS-SRSs across the subset of the CCs with the transmission power determined based on the single pathloss through the CCs. In some embodiments, the UE determines the single pathloss based on equation 1. In step S206, the network receives the each of the POS-SRSs across the subset of the CCs with the transmission power determined based on the single pathloss through the CCs from the UE.

Figure 3:
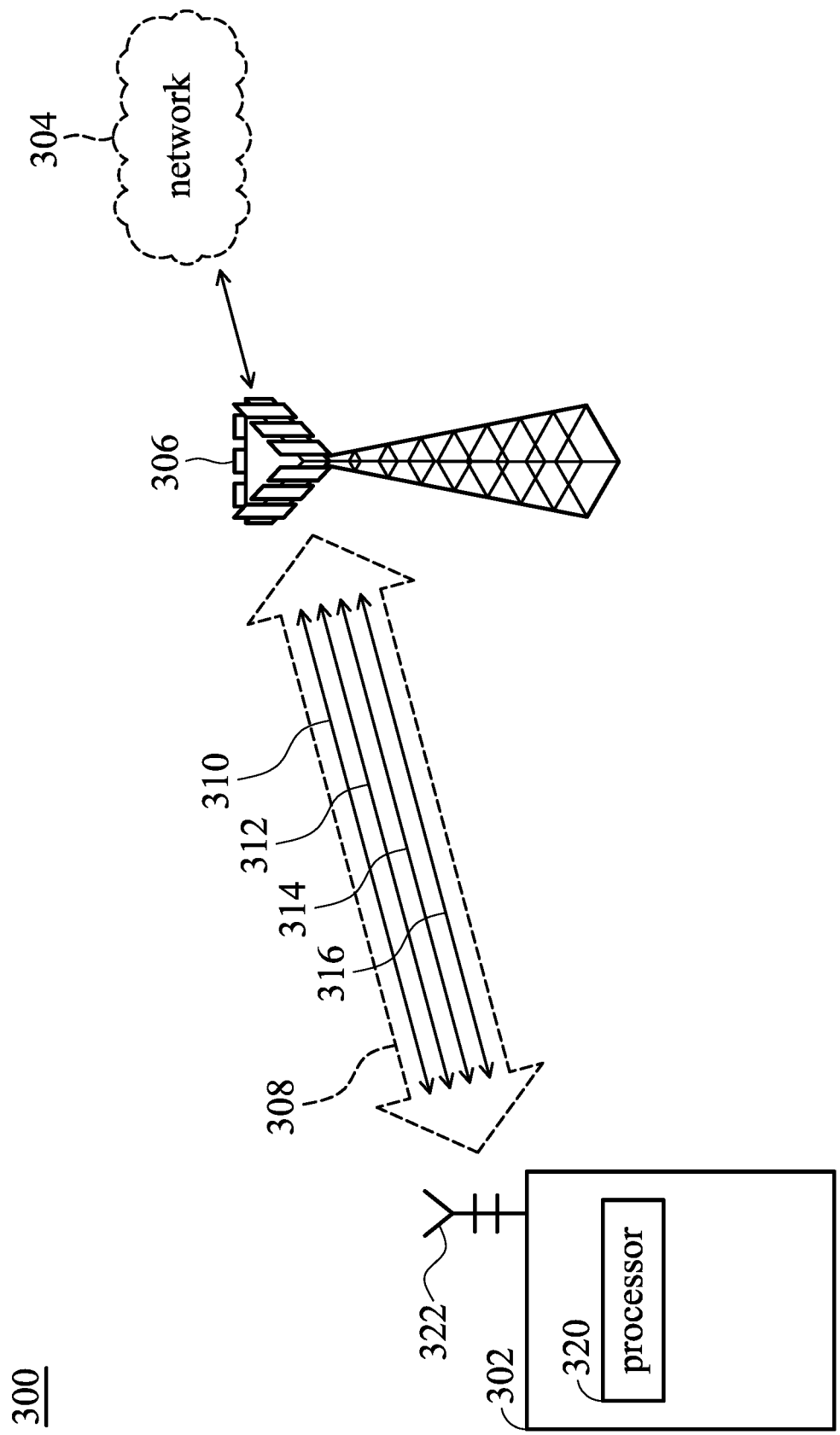
FIG. 3 is a schematic diagram of a scenario 300 in carrier aggregation in accordance with some embodiments of the present invention.

FIG. 3 is a schematic diagram of a scenario 300 in carrier aggregation in accordance with some embodiments of the present invention. As shown in FIG. 3, the scenario 300 includes a UE 302, a network 304, and a base station 306. In some embodiments, the UE 302 includes a processor 320 and an antenna 322. In some embodiments, the UE 302 and the base station 306 both support carrier aggregation. In some embodiments, the UE 302 is configured with carrier aggregation in a UE connected mode by the network 304. In some embodiments, the UE 302 can be, for example, a feature phone, a smart phone, a tablet, a desktop, a laptop, or a machine type communication (MTC) device, but the present invention is not limited thereto. In some embodiments, the base station 306 can be, for example, an eNB or a gNB, but the present invention is not limited thereto. In some embodiments, the network 304 may include, for example, an E-UTRAN and an EPC, but the present invention is not limited thereto. In some embodiments, the network may include a NG-RAN and a NG-CN (that is, 5G Core Network), but the present invention is not limited thereto.

In FIG. 3, the UE 302 is able to communicate with the base station 306 through an aggregated channel 308 including multiple component carriers (CCs), such as a CC 310, a CC 312, a CC 314, and a CC 316. The present invention does not limit the number of CCs in the aggregated channel 308. In some embodiments, the UE is able to connect to the base station 306 by a higher-layer signal (for example, the RRC signal) for the CCs 310, 312, 314, and 316. The UE is able to connect to the network 304 through the base station 306. In some embodiments, the network 304 transmits the SRS configuration to the base station 306, and the base station 306 passes the SRS configuration to the UE 302 through the CCs 310, 312, 314, and 316 in the aggregated channel 308. The UE 302 receives the SRS configuration for the CCs 310, 312, 314, and 316 through the antenna 322. In some embodiments, after receiving the SRS configuration, the processor 320 of the UE 302 measures pathlosses corresponding to the subset of the CCs. For example, the processor 320 measures a first pathloss corresponding to the CC 310, a second pathloss corresponding to the CC 312, a third pathloss corresponding to the CC 314, and a fourth pathloss corresponding to the CC 316.

In detail, the processor 320 measures a RSRP of a pathloss RS in the subset of the CCs. The pathloss RS has a configured power to be transmitted from the base station to the UE. The processor 320 calculates the power difference between the configured power and the RSRP of the pathloss RS corresponding to the subset of the CCs to obtain the passlosses. The processor 320 measures the power difference between a first pathloss reference signal (RS) corresponding to the CC 310 from the base station 306 to the UE 302 to obtain the first pathloss. The processor 320 measures the power difference of a second pathloss RS corresponding to the CC 312 from the base station 306 to the UE 302 to obtain the second pathloss. The processor 320 measures the power difference of a third pathloss RS corresponding to the CC 314 from the base station 306 to the UE 302 to obtain the third pathloss. The processor 320 measures the power difference of a fourth pathloss RS corresponding to the CC 316 from the base station 306 to the UE 302 to obtain the fourth pathloss. In some embodiments, the network 306 configures the UE 302 to perform the measuring step through the higher-layer signal.

After that, the UE 302 processes pathlosses measurements corresponding to the subset of the CCs to obtain a single pathloss. In detail, in some embodiments, the processor 320 of the UE 302 averages the first pathloss corresponding to the CC 310, the second pathloss corresponding to the CC 312, the third pathloss corresponding to the CC 314, and the fourth pathloss corresponding to the CC 316 to obtain the single pathloss. In some embodiments, the processor 320 selects the minimum pathloss or the maximum pathloss among the first, second, third, and fourth pathlosses corresponding to the CCs 310, 312, 314, and 316 as the single pathloss. In some embodiments, the processor 320 determines one pathloss among the first, second, third, and fourth pathlosses corresponding to the CCs 310, 312, 314, and 316 to obtain the single pathloss. In some embodiments, the network 306 configures the UE 302 to perform the processing step through the SRS configuration.

Then, the UE 302 determines the transmission power of the positioning (POS) sounding reference signals (SRSs) based on the single pathloss, and others, such as alpha/p0. In some embodiments, the UE 302 determines the transmission power of each of the POS-SRSs based on alpha or p0, but the present invention is not limited thereto. In detail, the processor 320 of the UE 302 substitutes the single pathloss into equation 1 to obtain the transmission power to transmit each of the POS-SRSs. Therefore, the processor 320 of the UE 302 transmits each of the POS-SRSs with the transmission power to the base station 306 through the CCs 310, 312, 314, and 316. After that, the network 304 receives each of the POS-SRSs with the transmission power determined based on the single pathloss through the CCs 310, 312, 314, and 316 to the base station 306 from the UE 302.

When SRS in different CCs is associated to the same downlink pathloss RS, the power for pathloss compensation in different CCs can be identical. However, when SRS in different CCs is associated to different downlink pathloss RS, then the measurement could product different measurement results. To make the pathloss compensation the same across CCs, the measurement results can be further processed by the method for controlling the transmission power of each of POS-SRSs across a subset of the CCs in carrier aggregation of the present invention. The method for controlling the transmission power of each of the POS-SRSs in carrier aggregation, applied to both the UE and the network, can achieve the technical effect that whole observed channel frequency response across different CCs can truly reflect the realistic channel, and observed channel power delay profile can truly reflect the realistic channel.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling transmission power of each of positioning (POS) sounding reference signals (SRSs) across a subset of multiple component carriers (CCs) in carrier aggregation, applied to a user equipment (UE), comprising:
   receiving a SRS configuration for the subset of the CCs;
   measuring pathlosses corresponding to SRS transmission in the subset of the CCs;
   processing pathloss measurements corresponding to the subset of the CCs to obtain a single pathloss across the subset of the CCs;
   determining the transmission power of each of the POS-SRSs across the subset of the CCs based on the single pathloss; and
   transmitting each of the POS-SRSs with the transmission power across the subset of the CCs.

2. The method as claimed in claim 1, wherein the step of processing the pathloss measurements corresponding to the subset of the CCs to obtain the single pathloss across the subset of the CCs comprises:
   averaging the pathlosses corresponding to the subset of the CCs to obtain the single pathloss.

3. The method as claimed in claim 1, wherein the step of processing the pathloss measurements corresponding to the subset of the CCs to obtain the single pathloss across the subset of the CCs comprises:
   selecting the minimum pathloss or the maximum pathloss among the pathlosses corresponding to the subset of the CCs as the single pathloss.

4. The method as claimed in claim 1, wherein the step of processing the pathloss measurements corresponding to the subset of the CCs to obtain the single pathloss across the subset of the CCs comprises:
   determining one pathloss among the pathlosses corresponding to the subset of the CCs to obtain the single pathloss.

5. The method as claimed in claim 1, wherein the step of measuring the pathlosses corresponding to the subset of the CCs comprises:
   measuring a reference signal received power (RSRP) of a pathloss reference signal (RS) in the subset of the CCs; wherein the pathloss RS has a configured power to be transmitted from a base station to the UE; and
   calculating the power difference between the configured power and the RSRP of the pathloss RS corresponding to the subset of the CCs to obtain the pathlosses.

6. The method as claimed in claim 1, wherein the step of processing the pathloss measurements corresponding to the subset of the CCs to obtain the single pathloss across the subset of the CCs is configured by a network.

7. The method as claimed in claim 1, wherein the SRS configuration is configured by a radio resource control (RRC) signal.

8. The method as claimed in claim 1, further comprising:
   processing a pathloss measurement corresponding to one of the subset of the CCs to obtain the single pathloss.

9. A method for controlling the transmission power of each of positioning (POS) sounding reference signals (SRSs) across a subset of multiple component carriers (CCs) in carrier aggregation, applied to a network, comprising:
   transmitting a SRS configuration for the subset of the CCs to a user equipment (UE);
   configuring the UE to measure pathlosses corresponding to SRS transmission in the subset of the CCs through the SRS configuration;
   configuring the UE to process pathloss measurements corresponding to the subset of the CCs through the SRS configuration to obtain a single pathloss across the subset of the CCs; and
   receiving each of the POS-SRSs across the subset of the CCs with the transmission power determined based on the single pathloss across the subset of the CCs from the UE.

10. The method as claimed in claim 9, wherein the step of configuring the UE to process the pathloss measurements corresponding to the subset of the CCs through the SRS configuration to obtain the single pathloss across the subset of the CCs comprises:
    configuring the UE to average the pathlosses corresponding to the subset of the CCs through the SRS configuration to obtain the single pathloss.

11. The method as claimed in claim 9, wherein the step of configuring the UE to process the pathloss measurements corresponding to the subset of the CCs through the SRS configuration to obtain the single pathloss across the subset of the CCs comprises:
    configuring the UE to selecting the minimum pathloss or the maximum pathloss among the pathlosses corresponding to the subset of the CCs as the single pathloss through the SRS configuration.

12. The method as claimed in claim 9, wherein the step of configuring the UE to process the pathloss measurements corresponding to the subset of the CCs through the SRS configuration to obtain the single pathloss across the subset of the CCs comprises:
    configuring the UE to determine one pathloss among the pathlosses corresponding to the subset of the CCs through the SRS configuration to obtain the single pathloss.

13. The method as claimed in claim 9, wherein the step of configuring the UE to measure the pathlosses corresponding to the subset of the CCs through the SRS configuration comprises:
    configuring the UE to measure a reference signal received power (RSRP) of a pathloss reference signal (RS) in the subset of the CCs; wherein the pathloss RS has a configured power to be transmitted from a base station to the UE; and
    configuring the UE to calculate the power difference between the configured power and the RSRP of the RS corresponding to the subset of the CCs to obtain the pathlosses.

14. The method as claimed in claim 9, wherein the SRS configuration is configured by a radio resource control (RRC) signal.

15. The method as claimed in claim 9, further comprising:
    configuring the UE to process a pathloss measurement corresponding to one of the CCs to obtain the single pathloss.

16. A user equipment (UE), comprising:
    a processor, configured to perform the following steps in carrier aggregation:
        receiving a sounding reference signal (SRS) configuration for a subset of multiple component carriers (CCs);
        measuring pathlosses corresponding to SRS transmission in the subset of the CCs;
        processing pathloss measurements corresponding to a subset of the CCs to obtain a single pathloss across the subset of the CCs;
        determining transmission power of each of positioning-sounding reference signals (POS-SRSs) across the subset of the CCs based on the single pathloss; and
        transmitting each of the POS-SRSs across the subset of the CCs with the transmission power across the subset of the CCs.

17. The UE as claimed in claim 16, wherein the UE averages the pathlosses corresponding to the subset of the CCs to obtain the single pathloss in the processing step.

18. The UE as claimed in claim 16, wherein the UE selects the minimum pathloss or the maximum pathloss among the pathlosses corresponding to the subset of the CCs as the single pathloss in the processing step.

19. The UE as claimed in claim 16, wherein the UE determines one pathloss among the pathlosses corresponding to the subset of the CCs to obtain the single pathloss in the processing step.

20. The UE as claimed in claim 16, wherein the UE measures a reference signal received power (RSRP) of a pathloss reference signal (RS) in the subset of the CCs; wherein the pathloss RS has a configured power to be transmitted from a base station to the UE; the UE calculates the power difference between the configured power and the RSRP of the pathloss RS corresponding to the subset of the CCs to obtain the pathlosses in the measuring step.

* * * * *